(12) United States Patent
Campbell et al.

(10) Patent No.: US 6,512,463 B1
(45) Date of Patent: Jan. 28, 2003

(54) BI-DIRECTIONAL PROTOCOL

(75) Inventors: David E. Campbell, Mountain View, CA (US); Eric T. Kiser, Lesage, WV (US)

(73) Assignee: American Meter Co., Scott Depot, WV (US)

( * ) Notice: Subject to any disclaimer, the term of this patent is extended or adjusted under 35 U.S.C. 154(b) by 0 days.

(21) Appl. No.: 09/281,519

(22) Filed: Mar. 30, 1999

(51) Int. Cl.⁷ .......................... G08B 23/00; G08C 15/06
(52) U.S. Cl. .................. 340/870.02; 370/312; 713/202
(58) Field of Search ................. 340/870.02; 370/312, 370/328, 349, 350; 713/202

(56) References Cited

U.S. PATENT DOCUMENTS

| | | | |
|---|---|---|---|
| 3,753,228 A | 8/1973 | Nickolas et al. | 340/146.1 |
| 3,777,066 A | 12/1973 | Nicholas | 179/69.5 R |
| 4,799,059 A | 1/1989 | Grindahl et al. | 340/870.03 |
| 5,056,107 A | 10/1991 | Johnson et al. | 375/1 |
| 5,252,967 A | 10/1993 | Brennan et al. | 340/870.02 |
| 5,428,555 A | 6/1995 | Starkey et al. | 364/551.01 |
| 5,448,230 A | 9/1995 | Schanker et al. | 340/870.03 |
| 5,451,938 A | 9/1995 | Brennan, Jr. | 340/870.14 |
| 5,459,459 A | 10/1995 | Lee, Jr. | 340/870.02 |
| 5,469,150 A | 11/1995 | Sitte | 340/825.07 |
| 5,493,287 A | 2/1996 | Bane | 340/825.52 |
| 5,495,239 A | 2/1996 | Ouellette | 340/870.02 |
| 5,519,387 A | 5/1996 | Besier et al. | 340/870.02 |
| 5,541,589 A | 7/1996 | Delaney | 340/870.02 |
| 5,553,094 A | 9/1996 | Johnson et al. | 375/200 |
| 5,668,803 A * | 9/1997 | Tymes et al. | 370/312 |
| 6,000,034 A * | 12/1999 | Lightbody et al. | 340/870.02 |
| 6,172,616 B1 * | 1/2001 | Johnson et al. | 340/870.02 |

* cited by examiner

*Primary Examiner*—Timothy Edwards, Jr.
(74) *Attorney, Agent, or Firm*—MacCord Mason PLLC

(57) ABSTRACT

A protocol for utility meter interrogation has a data write portion including: assembling a password transmission sequence having a synchronization string and a message including identification indicia for a select utility meter and a password to activate a select data access level within the select utility meter. This is wirelessly transmitted a first time to a select utility meter. Then, the password transmission sequence is wirelessly transmitted a second time to the select utility meter to confirm the password transmission sequence. A command transmission sequence having the synchronization string and a message including the identification indicia and a write command is assembled to cause the select utility meter to store data in a memory location of the select utility meter corresponding to the data access level activated with the password. The command sequence is then wirelessly transmitted to the select utility meter two times to confirm the command transmission sequence.

29 Claims, 8 Drawing Sheets

BI-DIRECTIONAL PROTOCOL

BACKGROUND OF THE INVENTION

The present invention relates to meter reading, and, in particular, remotely reading groups of meters using a bi-directional communication system and protocol.

Utility companies are taking advantage of modern technology to reduce costs and increase efficiency in meter reading applications using wireless technology to remotely gather information from large groups of meters. Traditionally, utility meters, such as electric, water and natural gas, were manually read by utility workers visiting each meter location. Current technology allows meters to be remotely accessed from a central location through wire or wireless communication links. To further increase ease of reading and meter installation, these meters are battery powered and operate to gather parameter measurements for the respective types of meters, and various other information, and then communicate this information to a portable or other remotely situated meter reading device.

In order to keep maintenance low and operating efficiency high, it is desirable to have meters which can operate for an extended period of time without requiring maintenance, battery replacement and the like. Maintenance requirements are generally reduced by increasing battery capacity and reducing power consumption. As a result, the meters generally cycle between low-power sleep modes, to conserve energy, and full-power awake modes, when any combination of meter reading, information gathering, information processing and data transmission may occur.

In operation, the meters periodically awaken from the sleep mode to gather information, such as meter parameter readings, and to check meter status. When the meter is awake, the parameter readings and meter status information may be wirelessly transmitted to the meter reading device and relayed on to a network or utility for processing the information. Additionally, information may be sent from the meter reader to the meter for various reasons, including setting or resetting meter values and storing operating information.

In these applications, many meters of many types may be located within range of the meter reading device. There is a need for a meter and communication protocol capable of providing bi-directional communications to a remote meter reader while avoiding interference from other meters as well as other radio frequency transmissions within the communication range of the meter reading device.

Furthermore, remote interrogation of meters may be performed by different personnel providing different services. For example, certain utility personnel may take meter readings while other personnel may need to configure parameters. Meter manufacturers may also need access to reconfigure software or provide service. In many cases, the different people having access to the meter should have varying levels of access to meter information and the ability to modify meter parameters and settings. Thus, there is a need for a remote meter reading system capable of providing varying levels of access to the people and devices capable of communicating with the meter.

SUMMARY OF THE INVENTION

The present invention provides a protocol allowing communication to and from a remote, utility meter with a meter reader capable of communicating with different types of meters using different levels of security for accessing select parameters. Accordingly, one aspect of the present invention relates to a protocol for utility meter interrogation including providing: a) a synchronization string, b) a basic command for indicating the presence or absence of an extended command, c) identification indicia, d) message length indicia for indicating an amount of data included in the message, e) message type indicia indicating utility meter and message type, f) an extended command corresponding to the message type indicia, and g) any data necessary for the command.

The protocol further includes assembling a transmission sequence to include the synchronization string followed by the basic command followed by the identification indicia and, if an extended command is present, followed by the message length indicia followed by the message type indicia followed by the extended command followed by any necessary data, transmitting the transmission sequence from an interrogator of a meter reader and receiving the transmission sequence at the select utility meter.

Preferably, a basic command is included having a first state indicating an extended command will be included in the message and, alternatively, a second state indicating an extended command will not be included in the message. Preferably, only one state is included in each command. Typically, the identification indicia is the serial number for the select utility meter and the message length indicia indicates an amount of information, such as the number of bytes, following the transmission sequence. The message type indicia preferably indicates whether the message is configured to read information from the select utility meter or alternatively to write information to the select utility meter, in addition to indicating the type of utility meter being interrogated. The utility meter type typically includes gas, electric, water or other utility meters.

Another aspect of the present invention provides a protocol for utility meter interrogation having a data write portion including: i) assembling a-password transmission sequence having a synchronization string and a message including identification indicia for a select utility meter and a password to activate a select data access level within the select utility meter; ii) wirelessly transmitting the password transmission sequence a first time to at least one utility meter including the select utility meter; iii) wirelessly transmitting the password transmission sequence a second time to the select utility meter following the first transmission to confirm the password transmission sequence; iv) assembling a command transmission sequence having the synchronization string and a message including the identification indicia and a write command configured to cause the select utility meter to store data in a memory location of the select utility meter corresponding to the data access level activated with the password; v) wirelessly transmitting the command sequence to the select utility meter following the second transmission; and vi) wirelessly transmitting the command sequence a second time to the select utility meter following the third transmission to confirm the command transmission sequence. The protocol may alternatively include a data read portion including: i) assembling a read transmission sequence having a synchronization string and a message including identification indicia for a select utility meter and a data command defining a parameter to be read from the select utility meter; ii) transmitting the read transmission sequence; and iii) receiving data transmitted from the select utility meter in response to transmitting the read transmission sequence.

The command transmission sequence is preferably transmitted within a predetermined period of the password transmission sequences wherein the select utility meter deactivates activation of the select data access level after the predetermined period expires. The predetermined period is preferably 10 seconds and may start upon activation of the data access level. The utility meters will preferably include a plurality of data access levels associated with multiple passwords, wherein each data access level is associated with memory locations for holding data.

Yet another aspect of the present invention provides a utility meter having a remote communication interface for communicating with an interrogation device. The device includes a metering device for measuring utility parameters and an output providing measurement indicia to a control system in memory. Communication electronics are associated with the control system and adapted to transmit received information to and from the meter reader interrogation device. The memory includes a plurality of partitions with passwords associated with each partition.

The control system is adapted to communicate with the interrogation device via the communication electronics using a select protocol to transmit information stored in the memory and store information transmitted from the interrogation device in the partitions. The control system also requires receipt of one of the associated passwords from the interrogation device to store data in one of the corresponding partitions. Preferably, the meter memory includes three partitions representing memory locations having increasing levels of security. Each partition includes a unique password for access to a corresponding partition.

Preferably, the protocol includes receiving data for storing data in a partition by: i) receiving a password transmission sequence including the synchronization string followed by a basic command followed by identification indicia followed by a message length indicia followed by a message type indicia followed by an extended command followed by the password; ii) receiving the password transmission sequence a second time; iii) receiving a data transmission sequence including the synchronization string followed by a basic command followed by identification indicia followed by a message length indicia followed by a message type indicia followed by an extended command followed by the data for storing in the partition; and iv) receiving the data transmission sequence a second time.

The control system is preferably adapted to allow access to the partition associated with the password after receiving the password transmission a second time and write data to the partition after receiving the data password a second time. Typically, access to the partition only lasts a predetermined period of time after receiving the password transmission sequence the second time.

Still another aspect of the present invention provides an interrogation device assembling the various transmission sequences to the various meters according to the protocol described above. The interrogation device includes a control system and communication electronics adapted to transmit and receive information to and from a remote communication unit according to the select protocol in order to interrogate various types of utility meters and access various levels of memory if select passwords are available or known by the interrogation device operator.

These and other aspects of the present invention will become apparent to those skilled in the art after reading the following description of the preferred embodiments when considered with the drawings.

DETAILED DESCRIPTION OF THE PREFERRED EMBODIMENTS

Figure 1:
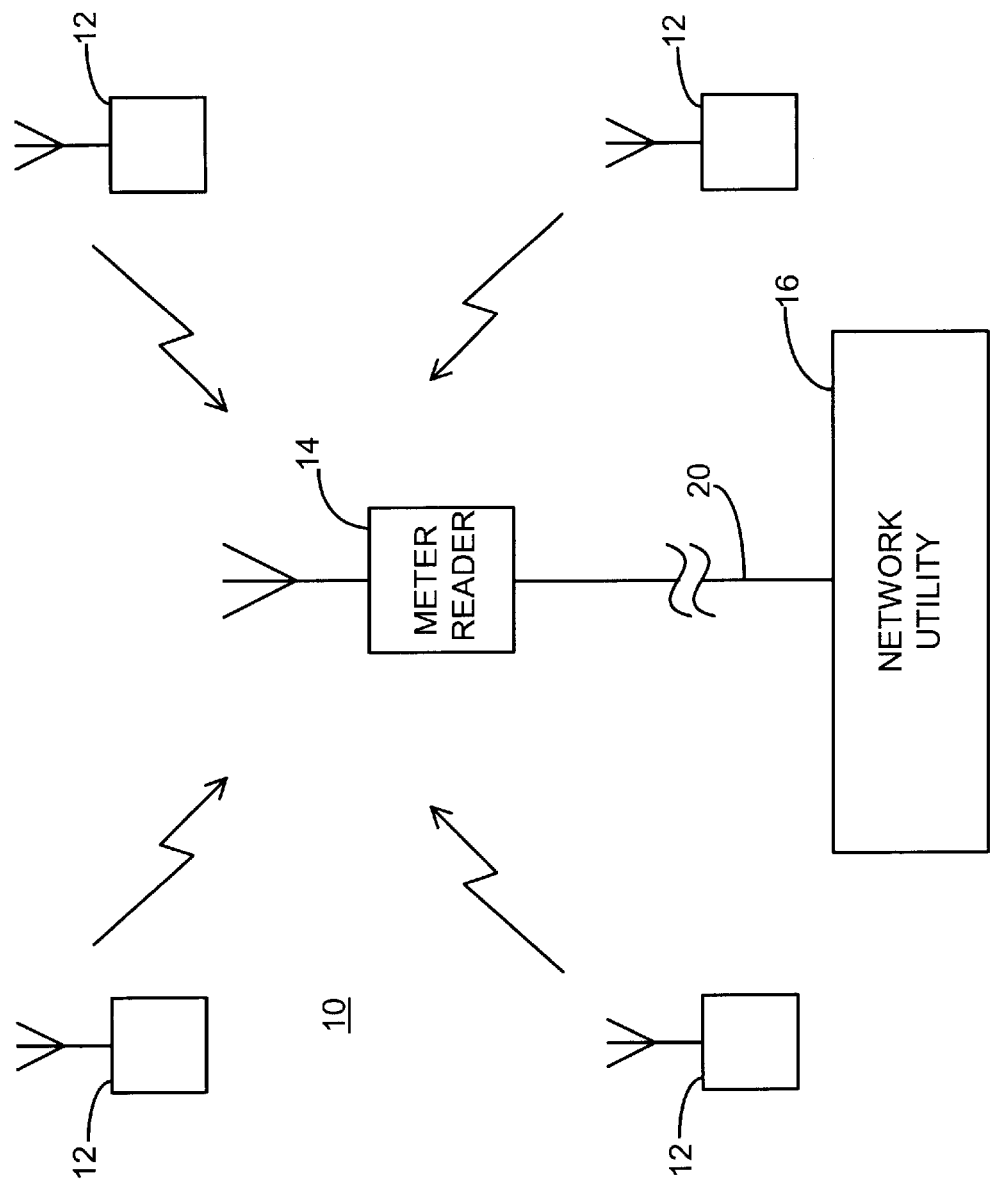
FIG. 1 is a schematic representation of a remote meter reading system constructed according to the present invention.

It should be understood that the illustrations are for the purpose of describing a preferred embodiment of the invention and are not intended to limit the invention thereto. With reference to the drawing figures, and FIG. 1 in particular, a remote meter reading system 10 is shown in accordance with the present invention. This system includes multiple utility meters 12 and a remote meter reading device, hereinafter meter reader 14. The meter reader 14 may be permanently located within communication range of the utility meters 12 wherein the meter reader is further coupled to a remote network or utility company computer system 16 via wire or wireless means. The network connection is made using a telephone line 20. Alternatively, the meter reader 14 may also be a remote, hand-held meter reader, which is carried throughout the location of the meters 12 or mounted in a vehicle and driven through the meter locations.

Figure 2:
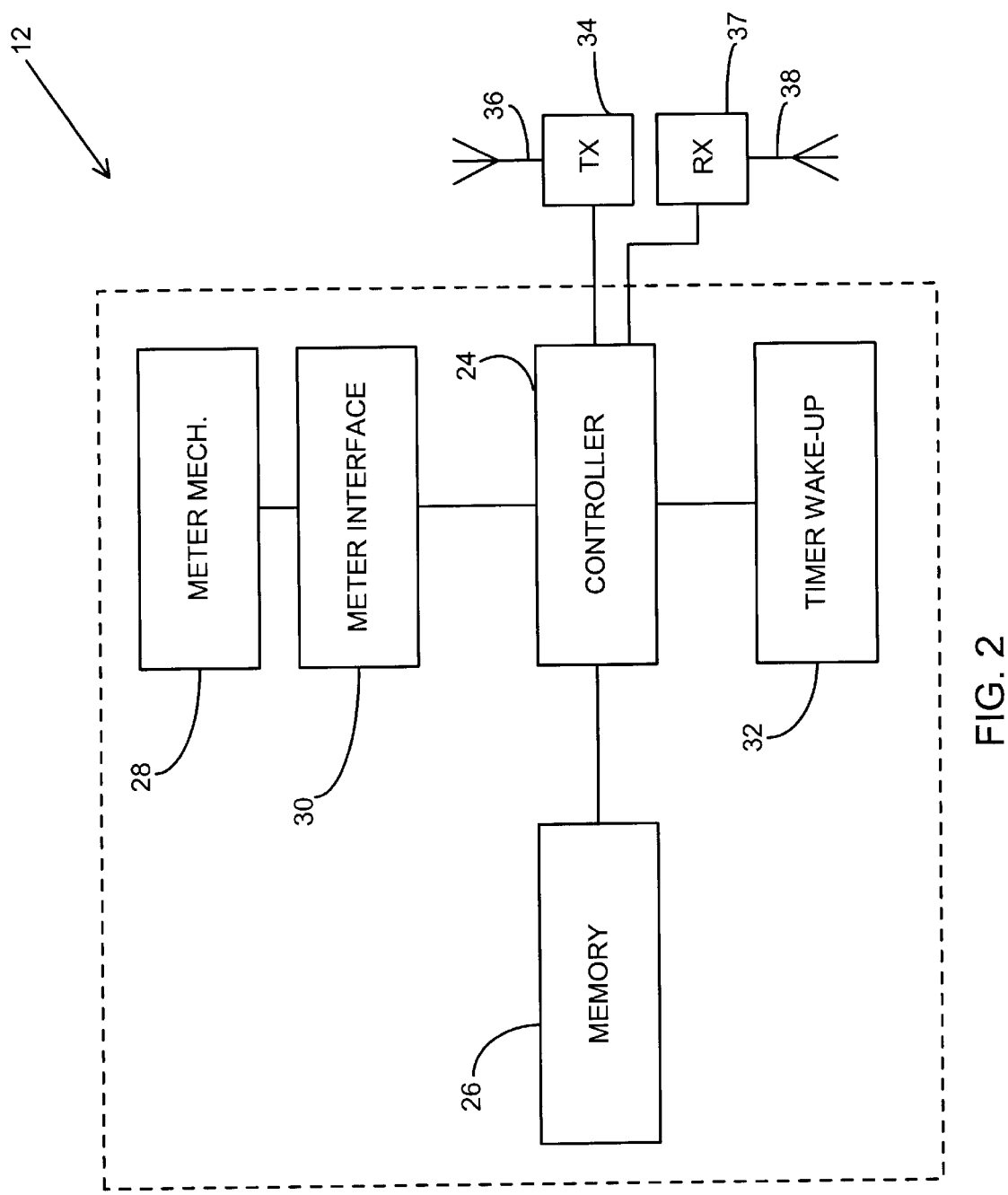
FIG. 2 is a block diagram of a utility meter constructed according to the present invention.

With reference to FIG. 2, a block diagram of a utility meter 12 is shown constructed according to the present invention. The meter 12 will include a control system having a controller 24 and memory 26. The controller 24 is adapted to gather data from metering mechanics 28 through a meter interface 30. The metering mechanics will provide utility measurement parameters based on usage for any number of utilities, such as electric, water, gas and other similar utilities.

The controller 24 will operate in conjunction with a timer or wake-up circuitry 32 to facilitate power consumption management, and preferably cycle between a low-power sleep mode and an active mode to measure parameters accumulating at the meter mechanics 28. The meter is also adapted to bi-directionally communicate with the remote meter reader 14 through communication electronics having a transmitter 34, receiver 36 and associated antennas 36, 37. The controller 24 and transmitter 34 cooperate to transmit communication signals over a communication channel, such as a radio frequency (RF) channel, using well-known principles. The controller 24 operates using logic and software associated with the controller 24 and memory 26. When signals are transmitted from the meter 12, a transmission sequence assembled by the controller 24 is processed by the transmitter 34 and radiated through the antenna 36.

The memory 26 has storage capabilities and can store information and parameters received from the metering mechanics 28 through the meter interface 30, along with various other types of information, such as identification indicia, software and hardware version numbers, serial numbers, utility meter type, pre-divider information and meter status information. The pre-divider information is representative of the multiple or divisor associated with the metering mechanics 28 to arrive at an accurate quantity or total parameter measurement. For example, the metering mechanics 28 of a natural gas flow meter may turn one hundred times for each cubic unit of gas passing through the meter. In this embodiment, the pre-divider would be a divisor of 100. The controller 24 in association with the memory 26 will assemble a transmission sequence from this information.

Figure 3:
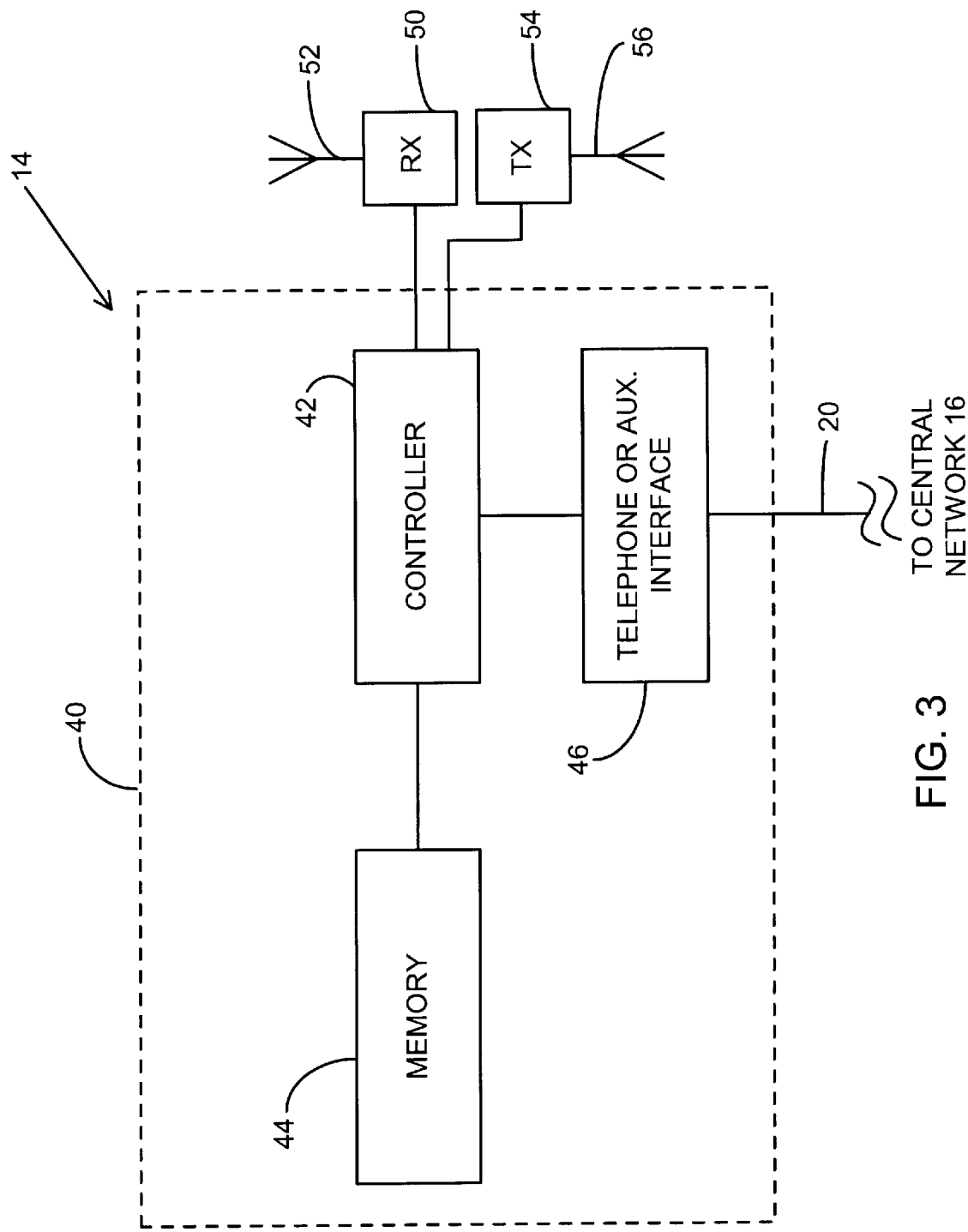
FIG. 3 is a block diagram of a meter reading device constructed according to the present invention.

A schematic of the remote meter reader 14 is shown in FIG. 3. The meter reader 14 generally includes a control system 40 having a controller 42, memory 44 and a telephone or other communication interface 46. The memory 44 preferably provides the necessary operating software for the controller 42 and provides storage capability for the information received from the various utility meters 12. The telephone interface 46, or like communication electronics, allows connection to the central network 16 or utility company in order to forward the information collected from the various utility meters for further processing. In applications where the meter is mobile, the interface 46 may be adapted to download information at the utility company after meter reading is finished. Alternatively, the communication electronics may be adapted to transmit the information to a central network or utility directly or through one or more relay stations (not shown). The meter reading device also includes a receiver 50, transmitter 54 and antennas 52, 56 cooperating with the controller 42 to receive and transmit transmission sequences to and from the various utility meters 12.

In operation, the various utility meters 12 will periodically, and preferably randomly, awake to take measurements and update parameters. While the meter electronics are "awake," the control system will read parameters from the metering mechanics 28, update the memory 26, and listen for transmissions from the meter reader 14 before resuming the low-power sleep mode. Alternatively, the meters may be configured to awake when an interrogation signal is received. If a transmission directed to the particular meter 12 is received, the meter will act or respond accordingly. During reading operations, the central system will typically assemble a transmission sequence and transmit the information to the remote meter reader 14.

Figure 4A:
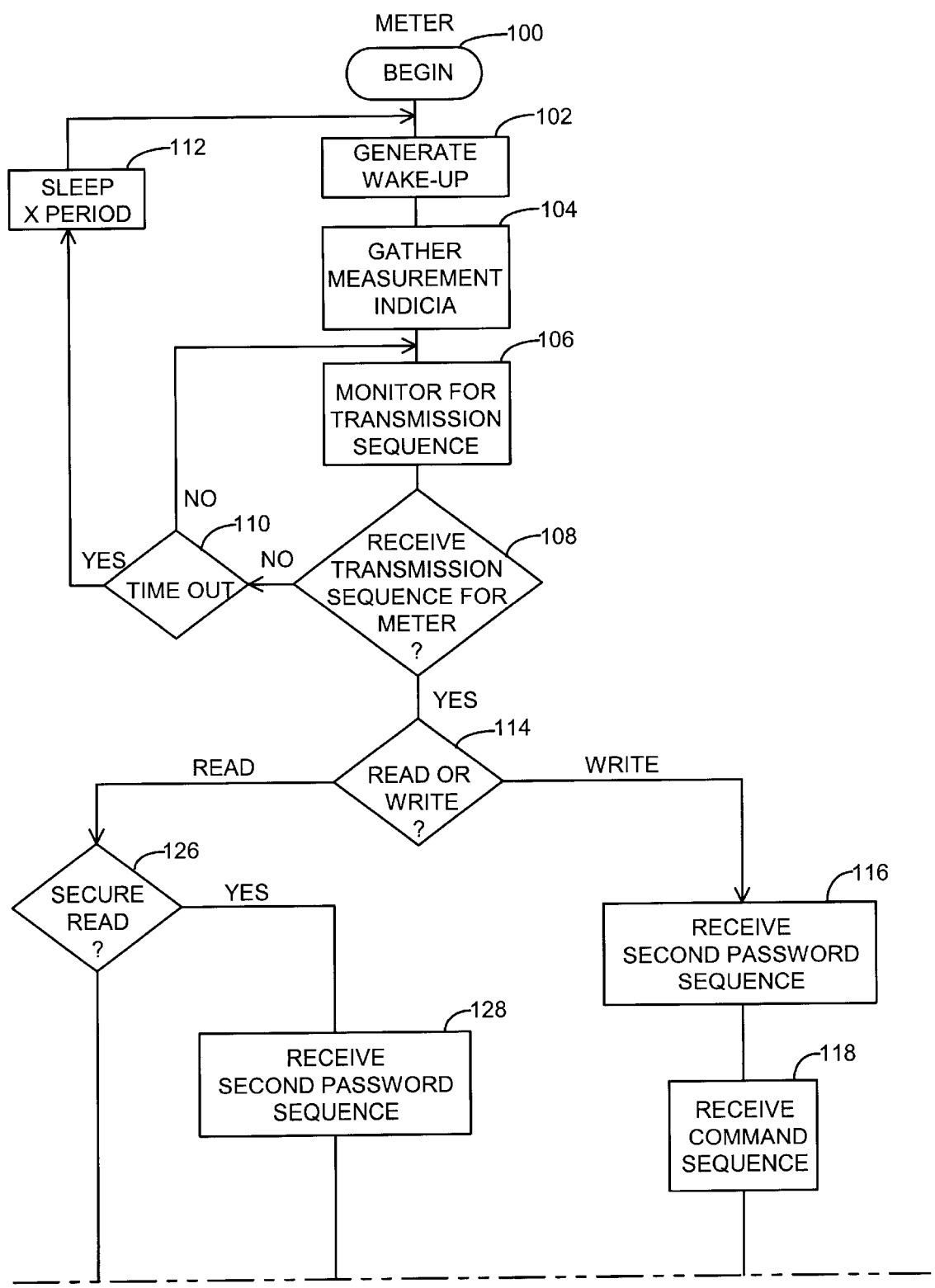
FIGS. 4A and 4B are a flowchart representing the basic operation of a meter constructed according to the present invention.
Figure 4B:
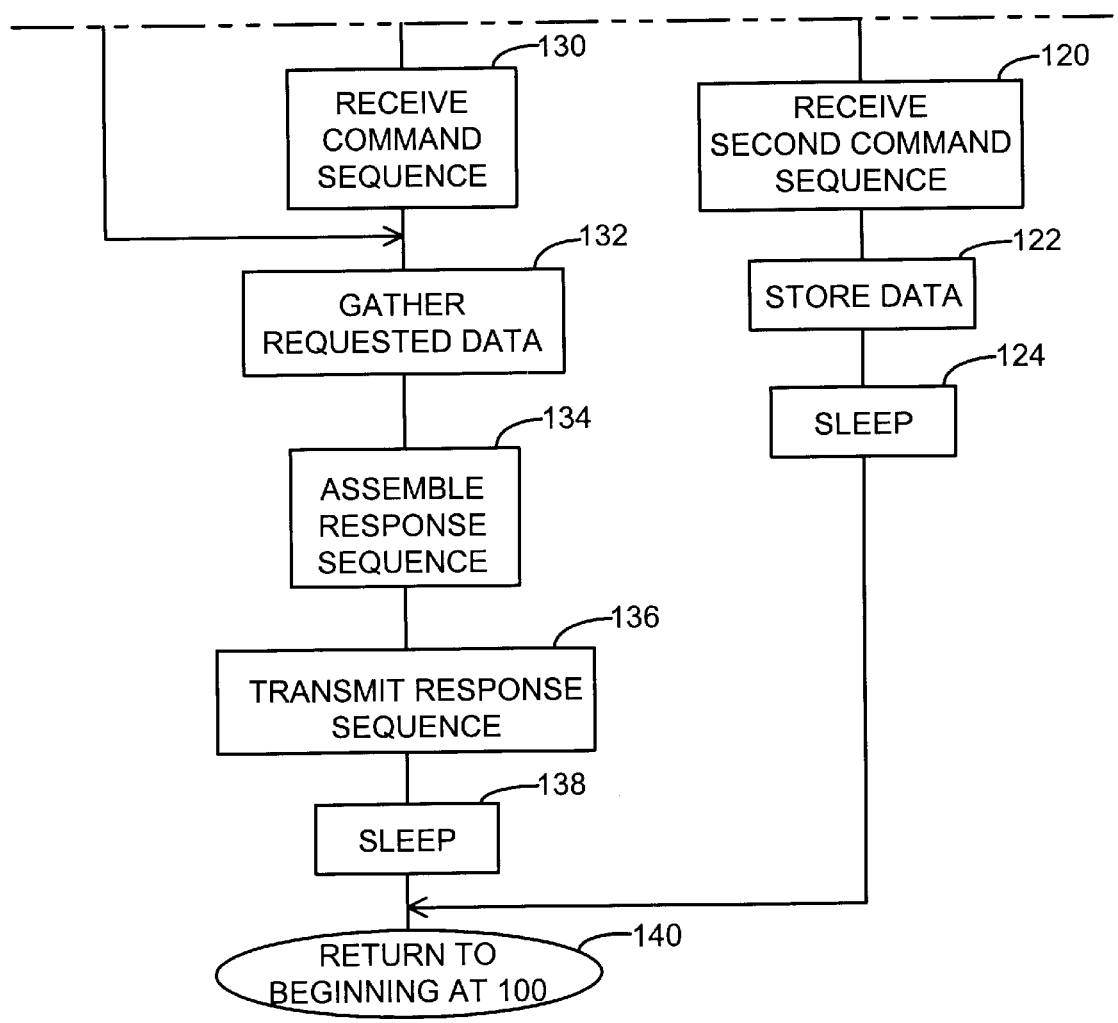

With reference to FIG. 4, a flow chart of the basic operation of each utility meter 12 is shown. The process begins (block 100) wherein the utility meter 12 is in a low-power sleep mode. The timer or wake-up circuitry 32 will subsequently generate a random wake-up signal (block 102) in order to activate the control system. Parameter or measurement indicia is gathered from the meter mechanics 28 and/or any electronic counting circuitry associated with the metering mechanics (block 104). The control system may also check memory 26 or other logic circuitry to determine identification indicia, hardware and software versions, serial numbers, utility meter type, pre-dividers and status information.

The control system will monitor for the reception of a transmission sequence from a meter reader 14 (block 106). As discussed below, the transmission sequence from the meter reader 14 will include identification indicia, preferably a serial number, of the meter selected for communication. The control system will receive transmissions and determine if the transmission sequence is directed at that particular meter (block 108). If there are no transmissions received within a select amount of time or the transmission sequence is not directed to that particular meter, the system will determine whether or not it should power down into the sleep mode (block 110). If it is not time for the meter to time out and power down, the control system will continue to monitor for transmission sequences directed to that particular meter (block 106,108). If the meter does time out (block 110), the meter will return to the sleep mode for a select period of time (block 112) until a wake-up is generated at the end of the sleep period (block 102), wherein the process repeats.

If a transmission, which is intended for the particular meter, is received (block 108), the control system will determine whether or not interrogation is configured to read data from the meter or write data to the meter (block 114). If a write command is found, the control system will monitor for a second transmission sequence identical to the first transmission sequence received (block 116). The control system will next monitor for a command sequence transmitted from the meter reader configured to have the control system store information in the memory at a level corresponding to the password received in the first two transmission sequences. As discussed in greater detail below, the meter, meter reader and associated protocol dictates memory accessibility based on varying security levels associated with the transmitted password. Thus, memory locations relating to certain parameters are accessible only by those having one password while other parameters are accessible by personnel having another password. Memory accessibility may be based on a hierarchical configuration wherein passwords associated with a higher security may also provide access to areas of a lower security.

After receiving the first transmission sequence, which will be a password transmission sequence for most write commands (block 108) and a second password transmission sequence (block 116), the control system will look for a first command sequence (block 118) followed by a second command sequence (block 120). Based on the command and any data included therein, the information or data will be stored accordingly in an associated memory location (block 122). If additional information is not transmitted or the control system times out, the meter will return to the low-power sleep mode (block 124) and return to the beginning (block 140).

If the first transmission sequence includes a basic read command (block 114), the control system will determine whether or not the transmission sequence is configured for a secure read or an unsecure read (block 126). A secure read requires the first transmission sequence to include a password and reception of a duplicate transmission sequence including the password (block 128). A command sequence will follow (block 130) wherein the request for information is gathered (block 132), assembled into a transmission response sequence (block 134) and transmitted to the meter reader (block 136). If no other communications are necessary, the meter will power down into a sleep mode (block 138) and the process will return to the beginning (block 140).

If the read command does not require a secure read, the first transmission sequence preferably will include the necessary command information indicating the data to include and any response. Thus, the control system will simply gather the requested data (block 132), assemble the data into a transmission response sequence (block 134) and transmit the transmission response sequence (block 136) to the meter reader 14. The meter will then power down into the sleep mode (block 138) if no further communications are necessary and/or the control system times out. The process will return to the beginning (block 140).

Figure 5A:
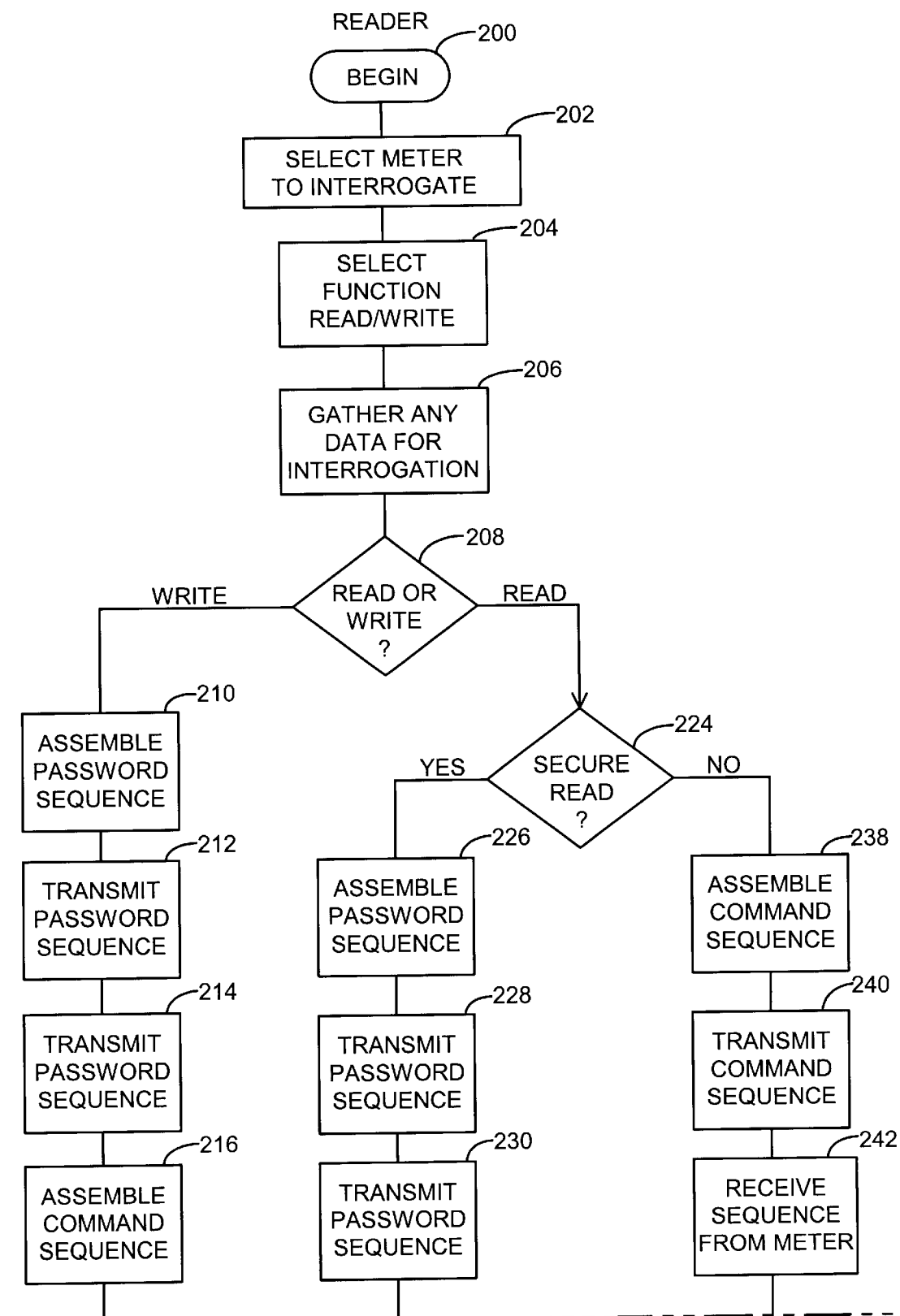
FIGS. 5A and 5B represent the preferred protocol sequence for communicating information from a utility meter to a remote reading device according to the present invention.
Figure 5B:
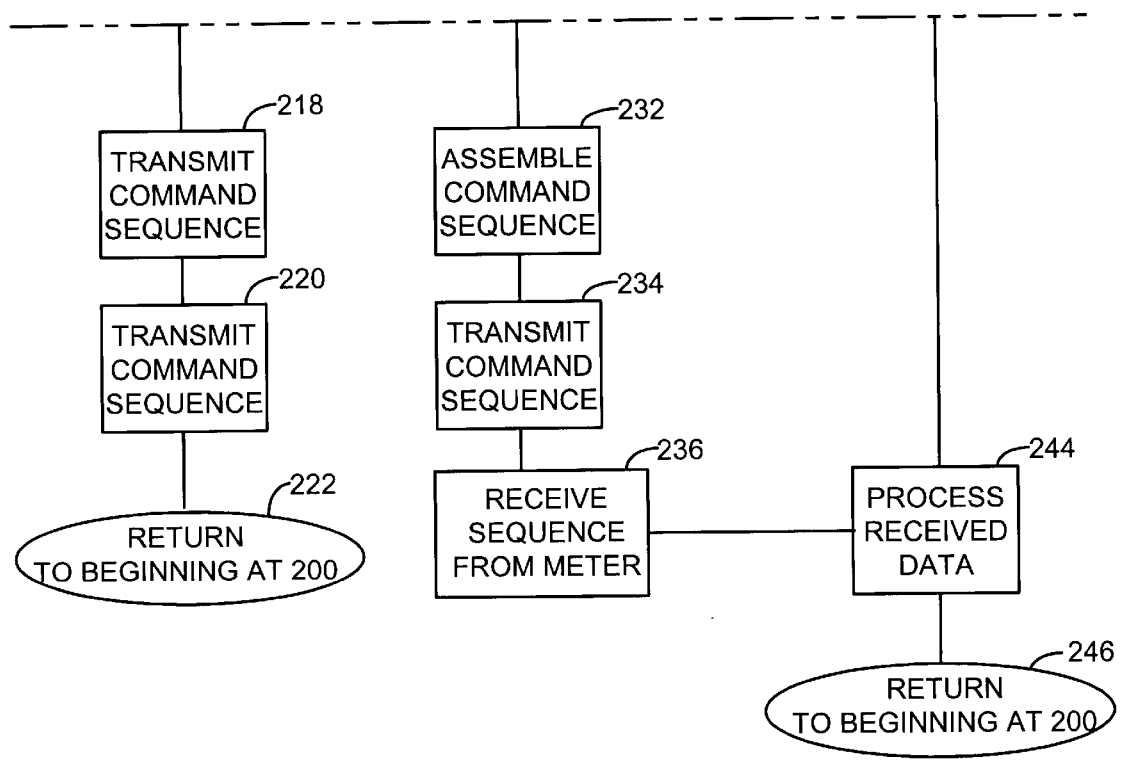

Turning now to FIGS. 5A and 5B, a flow chart of the basic operation of the meter reader 14 is shown. The process begins at block 200 wherein the meter reader or operator selects the meter to interrogate (block 202) and the desired function or command for interrogation (block 204). The command may be used to read information from the meter or write information to the meter. The meter reader will gather any information, data or commands necessary for the interrogation (block 206).

The control system of the meter reader 14 will configure transmission sequences according to the type of command used in the interrogation (block 208). If the command is configured to write information to a particular meter, a password transmission sequence is assembled (block 210) based on the parameter or parameters being written (block 210). The transmission sequence may also include the particular meter's identification indicia, preferably a unique serial number. Once the password transmission sequence is assembled, the control system operates in conjunction with the transmitter 54 to transmit the transmission sequence over the meter location for reception by the designated meter (block 212). Notably, any of the sequences transmitted over the field will most likely be received by other meters.

The meters may ignore these transmissions if the identification indicia of the transmission sequence does not match the identification indicia or serial number stored at the meter 12. After the first password transmission sequence is transmitted, a second, identical password transmission sequence is transmitted (block 214). The control system will next assemble a command sequence (block 216) and transmit the command sequence a first time (block 218) and a second time (block 220) before returning to the beginning of the process (block 222). In order to conserve energy and reduce communication complexity, a response from the meter is not required for interrogations writing information to the meter. However, each "write" command requires duplicate transmission of the password sequence to activate a security level and duplicate transmission of the command sequence to confirm proper reception of the command sequence. Preferably, during a write command, access to a memory location corresponding to the password of the duplicate transmission password sequences is allowed by the meter for transmissions occurring within a select amount of time, such as ten seconds, after receiving the second password transmission sequence.

If the interrogation is a "read" command (block 208), the control system will assemble transmission sequences according to whether or not security is necessary for the read command (block 224). If security is necessary, the control system will assemble a password transmission sequence for the appropriate security level required to read information from the meter's memory (block 226) and transmit the password transmission sequence a first time (block 228) and a second time (block 230). The control system of the meter reader then assembles a command sequence defining the parameter or parameters to be read (block 234) and awaits to receive the transmission sequence from the meter (block 236).

If the read command does not require security (block 224), a command sequence is assembled (block 238) and transmitted (block 240). The control system will await a response from the meter (block 242). After a response is received from the meter for secure read, the control system processes the received data (block 244) and returns to the beginning (block 246).

Figure 6:
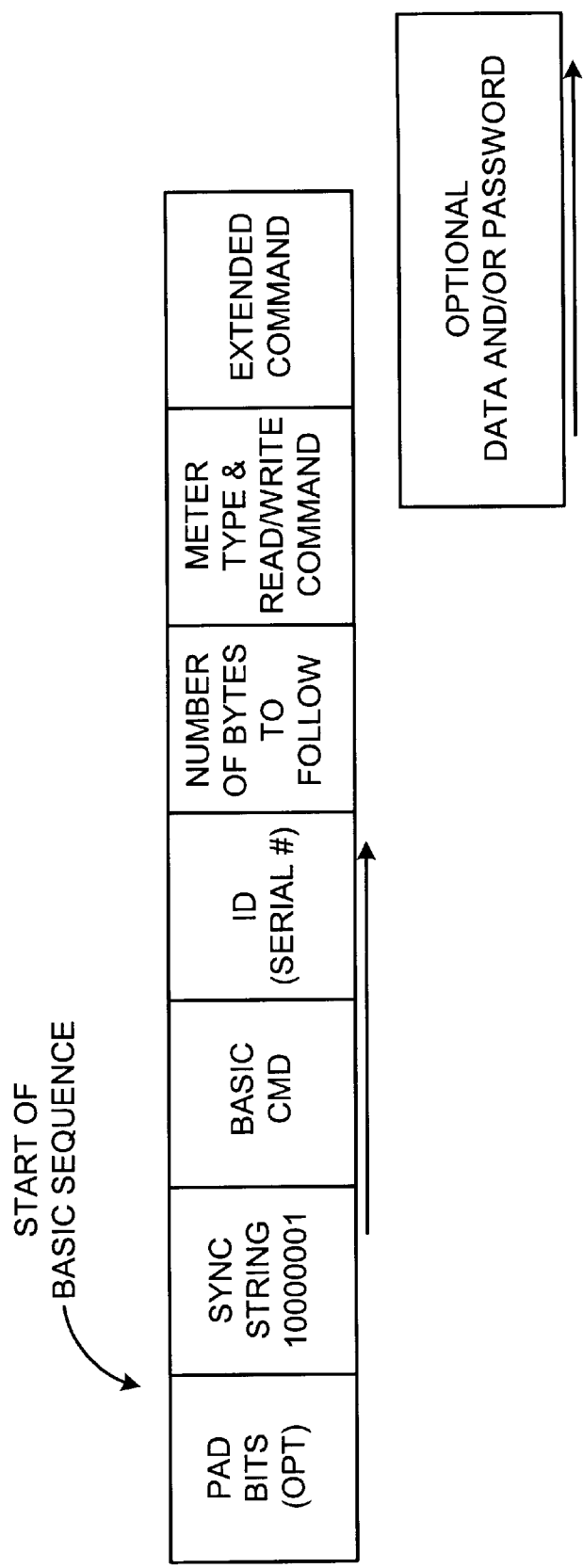
FIG. 6 represents a basic transmission sequence of a protocol according to the present invention.

With reference to FIG. 6, a basic transmission sequence of the protocol is shown. Each sequence may include certain padding bits between transmissions and will all include a synchronization string, preferably a "10000001" string, signifying the start of a new sequence. The synchronization string is followed by a basic command, identification indicia, the number of bits or bytes to follow, meter type indicia, a read/write command designation, an extended command and optional data and/or a password. Each of these sections of the sequence will be described in detail below.

In general, any command sequences which require reply from the meter have a set length, such as 40 bits. Preferably, the time from the last bit of a sequence to the reply from the transponder is substantially constant for all commands. In other words, the interrogating meter reader looks at the reply bits based on the time from the end of the transmission of the interrogation sequence(s). If, for some reason, there is not enough time for the oscillator of the meter transmitter to stabilize before a reply must be sent, the oscillator may have to be powered up before all bits of the interrogation have been received at the meter.

The protocol is an inventive extension of basic Trace commands used by American Meter to interrogate meters using basic commands. Initially, the meter reader may interrogate the meter to gather the meter's serial number. The message format for a transmission from the meter reader to the meter is shown below:

PAD /-SYNC--\ CMD /MSD—7 DIGIT SERIAL NUMBER---LSD\
11 1000 001 XX00 bbbb cccc dddd eeee ffff gggg hhhh The following is the message format for basic transmissions from the meter to the meter reader:

VERSION
PAD NUMBER /MSD----8 DIGIT SERIAL NUMBER------LSD\
00 11 iiii aaaa bbbb cccc dddd eeee ffff gggg hhhh A basic command of the meter reader is to request the meter to transmit back reading information, evidence of tampering, and check sum status. The message format for this transmission follows:

PAD /-SYNC--\ CMD /MSD—7 DIGIT SERIAL NUMBER---LSD\
11 1000 0001 XX01 bbbb cccc dddd eeee ffff gggg hhhh The BCH code, designated with the string of "n's," is known in the communication art and has the ability to correct single bit errors and recognize multiple bit errors. The return message may be as follows:

/MSB-----LSB\       /MSD----Meter Reading----LSB\
nnnnnn nnnnnn JKLM 0000 ssss ssss ssss ssss ssss The novelty of the invention lies in the modification of these basic message formats to allow for extended commands providing for the reading and writing of information from and to different types of meters using varying levels of security to selectively limit access to various personnel. The extended commands can be used to either read the values of various meter parameters or to write or program values for any number of select parameters. In general, writing the value of a parameter can be performed only after activating the appropriate security level by writing the value of the security password to the meter.

If the security password stored in memory matches the security password in the message, then the security level is activated for a limited amount of time, preferably ten seconds. In the preferred embodiment, there are three security levels, and the only way to actually change a stored security password at the meter is to activate the high security level commonly referred to as security level 3, which will allow security passwords for security levels 1, 2 and 3 to be changed within the activation period. Furthermore, the protocol requires that any write command include two consecutive transmission sequences for messages to be sent with pad bits or less than an enumerated number of bad bits between them. Preferably, the commands must be identical. With the exception of reading passwords of other levels, read commands do not require passwords. Attempts to read password values without proper security access to security level 3 will result in the meter returning a false value, such as 000000.

The message format from the meter reader to the meter for the extended protocol is:

```
← Shift Direction
PAD /-SYNC--\ CMD /MSD--7 DIGIT SERIAL NUMBER---LSD\(next)
11 1000 0001 X011 bbbb cccc dddd eeee ffff gggg hhhh (line)
                /MSD /--- OPTIONAL DATA BITS -LSD\
tttt uuuu vvvv vvvv wwww wwww wwww wwww wwww wwww wwww
```

The message format from the meter to the meter reader is preferably:

```
BCH Code
/MSB---LSB\ /MSD -- OPTIONAL DATA BITS -\ LSD\
nnnnnn nnnnnn wwww  wwww  wwww  wwww  wwww  wwww  wwww
              or    or    or    or    or    or
              0000  0000  0000  0000  0000  0000
```

In each of these formats, x="don't care" and can be either a logic 0 or 1.

Notably, "aaaa" represents the most significant digit of the serial number and the "hhhh" is the least significant digit of the serial number. The letters in between represent the digits of the serial number between the most and least significant digits. Preferably, the digits in these messages use AMR code (American Meter Company's meter-reading code), wherein the numbers 0–9 are assigned a predetermined bit string as shown below.

```
AMR code – 0 = 0011
           1 = 1001
           2 = 1010
           3 = 1011
           4 = 1100
           5 = 1101
           6 = 1110
           7 = 0101
           8 = 0110
           9 = 0111
Wildcard (always match) = 1111 (only applies to serial #)
```

The wildcard match may be used in order to poll the meter for its serial number. The AMR code is configured to assure that any combination of numbers will not result in a string identical to the synchronization string, which is preferably 10000001.

In these message formats, the "iiii" in the basic command set will represent the meter's hardware and/or software version number. As noted, the string of n's represents a 12-bit BCH code. The string of s's is preferably used to accommodate a five-digit meter reading using AMR codes. The string of t's indicates the number of bytes following reception of the current byte. Thus, the length of the message is made known to the meter upon transmission. The string of u's represents an extended message type. The extended message type indicates the presence or absence of an extended message, the type of meter the message is intended to receive, and whether the command is a read or write command.

Preferably, the extended message type is configured as shown below.

0=Non-extended Message
1=Gas Meter read
2=Water Meter Write
3=Water Meter Read
4=Water Meter Write
5=Electric Meter Read
6=Electric Meter Write
7=Generic Data Transfer Read
8=Generic Data Transfer Write
9=Reserved The string of v's represents the extended command. The extended command and the corresponding number of bytes to follow is outlined below.

```
vvvv  vvvv  tttt  (**4)  wwww wwww wwww wwww wwww wwww wwww
 0     0     3      1    **1 **2 **3 \---------Notused-----------\
 0     1     5      N    \MSD---------Maximum Demand-----------LSD/
 0     2     5      N    \MSD------Cumulative Demand-------------LSD/
 0     3     5      N    \MSD--- Cont. Cumulative Demand--------LSD/
 0     4     5      N    \MSD--- Current Interval Demand---------LSD/
 0     5     2      1    0 (Demand Reset Upon a Write)
 0     6     4      N    \MSD-------**5-----------LSD/
 0     7     3      N    \MSD--------LSD/ (Power Outage Counter)
 0     8     3      N    \MSD--------LSD/ (Demand reset Counter)
 0     9     3      N    \MSD--------LSD/ (time Left in Sub. Int.)
 2     0     5      2    \MSD--------Demand Threshold------LSD/
 2     1     3      2    \MSD--------LSD/ (Sub-Interval Length)
 2     2     3      2    0 MSD LSD (# of Sub-Intervals)
 2     3     3      2    0 MSD LSD (1/Interval Length)
 2     4     3      2    \MSD---------LSD/ (Delay After Outage)
```

-continued

| 2 | 5 | 2 | 2 | **6 (Digital Output Configuration) |
| 2 | 6 | 4 | 2 | \MSD-Meter Reading - LSD/ |
| 4 | 0 | 2 | 3 | 0 (EEPROM Reset Upon a Write **7) |
| 4 | 1 | 5 | 3 | \MSD-Level 1 Security Password - LSD/ |
| 4 | 2 | 5 | 3 | \MSD-Level 2 Security Password - LSD/ |
| 4 | 3 | 5 | 3 | \MSD-Level 3 Security Password - LSD/ |
| 4 | 4 | 4 | 3 | \MSD-------------**8-----------LSD/ |
| 4 | 5 | 2 | 3 | **9 (Reverse Disk Behavior) |

**1 = 0 - Normal RAM Operation (AMR coded - See Note 1) 1 = RAM Checksum Error
**2 = 0 = -Normal Meter Operation (AMR coded - See Note 2) 1 = Reverse Meter Operation has Occurred
**3 = 0 = Normal Meter Operation (AMR coded - See Note 1) 1 = A Power Outage has Occurred
**4 = N = This Parameter is NOT Writable 1 = Security Level 1 Must be Active to Write this Parameter 2 = Security Level 2 Must be Active to Write this Parameter 3 = Security Level 3 Must be Active to Write this Parameter
**5 = Meter Sub-Reading (4 AMR coded digits)
**6 = 0 = Digital Output Indicates End of Interval - AMR coded 1 = Digital Output Indicates Demand Threshold Exceeded
**7 = All parameter values go to factory defaults, including all security passwords.
**8 = Programming Watt-Hour Constant
**9 = 0 = Add (AMR coded - See Note 1) 1 = Subtract 2 = Ignore As shown above, the extended command string ("vvvv vvvv") corresponds to the string indicating the number of bytes to follow ("tttt") to enable the meter to recognize the command and the number of bytes to receive for the command, since each command may require varying lengths of information. Furthermore, certain commands and memory locations are read-only, which indicate the parameters are not writable.

Certain modifications and improvements will occur to those skilled in the art upon reading the foregoing description. It should be understood that all such modifications and improvements have been deleted herein for the sake of conciseness and readability, but are properly within the scope of the following claims.

What is claimed is:

1. A protocol for utility meter interrogation comprising:
   a. providing a synchronization string for indicating a start of a message transmitted to a utility meter;
   b. providing a basic command for indicating the presence or absence of an extended command included in the message;
   c. providing identification indicia for a select utility meter;
   d. providing message length indicia for indicating an amount of data included in the message when an extended command is present;
   e. providing message type indicia for indicating utility meter and message type wherein the message type indicia indicates a meter type selected from the group consisting of gas, electric and water;
   f. providing an extended command corresponding to the message type indicia when an extended command is present;
   g. providing data associated with the extended command, if necessary, when an extended command is present;
   h. assembling a transmission sequence to include the synchronization string followed by the basic command followed by the identification indicia and, if an extended command is present, followed by the message length indicia followed by the message type indicia followed by the extended command followed by the data, if necessary;
   i. transmitting the transmission sequence from an interrogator of a meter reader; and
   j. receiving the transmission sequence at the select utility meter.

2. The protocol of claim 1 wherein the synchronization string is 10000001 and the message is assembled in the assembling step to avoid having a string of 10000001 other than the synchronization string.

3. The protocol of claim 1 wherein the basic command includes at least first and second states, the first state indicating an extended command will be included in the message and the second state indicating an extended command will not be included in the message.

4. The protocol of claim 1 wherein the identification indicia is a serial number for the select utility meter.

5. The protocol of claim 1 wherein the message length indicia indicates an amount of information to follow in the transmission sequence.

6. The protocol of claim 5 wherein the message length indicia indicates a number of bytes following the message length indicia.

7. The protocol of claim 1 wherein the message type indicia indicates the message is configured to read information from the select utility meter or alternatively write information to the select utility meter.

8. The protocol of claim 1 wherein the message type indicia indicates the message is configured to read information from the select utility meter or alternatively write information to the select utility meter.

9. The protocol of claim 1 further comprising assembling the transmission sequence to include additional pad bits preceding the synchronization string to facilitate the utility meter synchronizing on the transmission sequence during the receiving step.

10. The utility meter of claim 1 wherein the protocol includes:
    a. receiving a transmission sequence including the synchronization string followed by a basic command followed by identification indicia followed by message length indicia followed by message type indicia followed by an extended command and, if necessary, followed by the data corresponding to the extended command.

11. A protocol for utility meter interrogation comprising a data write portion comprising:

a. assembling a password transmission sequence having a synchronization string and a message including identification indicia for a select utility meter and a password to activate a select data access level within the select utility meter;
b. wirelessly transmitting the password transmission sequence a first time to at least one utility meter including the select utility meter;
c. wirelessly transmitting the password transmission sequence a second time to the select utility meter following the first transmission to confirm the password transmission sequence;
d. assembling a command transmission sequence having the synchronization string and a message including the identification indicia and a write command configured to cause the select utility meter to store data in a memory location of the select utility meter corresponding to the data access level activated with the password;
e. wirelessly transmitting the command transmission sequence to the select utility meter following the second transmission; and
f. wirelessly transmitting the command transmission sequence a second time to the select utility meter following the third transmission to confirm the command transmission sequence.

12. The protocol of claim 11 further comprising a data read portion comprising:
a. assembling a read transmission sequence having a synchronization string and a message including identification indicia for a select utility meter and a data command defining a parameter to be read from the select utility meter;
b. transmitting the read transmission sequence; and
c. receiving data transmitted from the select utility meter in response to transmitting the read transmission sequence.

13. The protocol of claim 12 wherein the assembling steps include providing a read command in the message for the data read portion and providing a write command in the message for the data write portion.

14. The protocol of claim 12 wherein the assembling steps include providing meter type indicia for selecting a type of utility in which the select utility meter is associated.

15. The protocol of claim 14 wherein the type of utility meter is one of the group consisting of gas, water and electric.

16. The protocol of claim 12 wherein the assembling steps include
a. providing a read command and utility meter type indicia in the message for the data read portion, and
b. providing a write command and utility meter type indicia in the message for the data write portion.

17. The protocol of claim 16 wherein the utility meter type indicia represents one of the group consisting of gas, water and electric.

18. The protocol of claim 12 wherein the select utility meter includes a plurality of data access levels associated with passwords, each data access level associated with memory locations for holding data.

19. The protocol of claim 12 wherein the assembling step includes:
a. providing the synchronization string for indicating a start of a message transmitted to a utility meter;
b. providing a basic command for indicating the presence or absence of an extended command included in the message;
c. providing identification indicia for a select utility meter;
d. providing message length indicia for indicating an amount of data included in the message when an extended command is present;
e. providing message type indicia for indicating utility meter and message type;
f. providing an extended command corresponding to the message type indicia when an extended command is present;
g. providing information associated with the extended command, if necessary, when an extended command is present; and
h. assembling the transmission sequence to include the synchronization string followed by the basic command followed by the identification indicia and, if an extended command is present, followed by the message length indicia followed by the message type indicia followed by the extended command followed by the information, if necessary, into a transmission sequence.

20. The protocol of claim 19 wherein the information is a password for the password transmission sequence and data to be written to the select utility meter for the command sequence.

21. The protocol of claim 12 wherein the command transmission sequences are transmitted within a predetermined period of the password transmission sequences wherein the select utility meter deactivates activation of the selected data access level after the predetermined period expires.

22. The protocol of claim 21 wherein the predetermined period starts upon activation of the data access level.

23. The protocol of claim 22 wherein the predetermined period is ten (10) seconds.

24. A utility meter having a remote communication interface for communicating with an interrogation device comprising:
a. a metering device for measuring a utility parameter and having an output providing measurement indicia;
b. a control system and memory associated with said metering device to receive measurement indicia, said memory having a plurality of partitions and passwords associated with said partitions; and
c. a communication electronics associated with said control system adapted to communicate with an interrogation device;
d. said control system adapted to:
   i. communicate with the interrogation device via said communication electronics using a select protocol to transmit information stored in said memory and store information transmitted from the interrogation device in said partitions; and
   ii. require receipt of one of the associated passwords from the interrogation device to store data in a corresponding one of said partitions.

25. The utility meter of claim 24 wherein said memory includes three partitions representing memory locations having increasing levels of security, each said partition having a unique password for access to a corresponding said partition.

26. The utility meter of claim 24 wherein
a. the protocol for receiving data for storing data in a partition includes:
   i. receiving a password transmission sequence including the synchronization string followed by a basic command followed by identification indicia followed by message length indicia followed by message type indicia followed by an extended command followed the password;

ii. receiving the password transmission sequence a second time;

iii. receiving a data transmission sequence including the synchronization string followed by a basic command followed by identification indicia followed by message length indicia followed by message type indicia followed by an extended command followed by the data for storing in said partition; and iv. receiving the data transmission sequence a second time; and b. said control system is further adapted to allow access to said partition associated with said password after receiving the password transmission a second time and write data to the partition after receiving the data password a second time.

27. The utility meter of claim 24 wherein said control system is adapted to allow access to said partition only for a predetermined period after receiving the password transmission sequence a second time.

28. An interrogation device for interrogating utility meters using wireless communications comprising:

a. a control system; and b. communication electronics associated with said control system adapted to wirelessly communicate with utility meters using a select protocol, said control system adapted to:

i. provide a synchronization string for indicating a start of a message transmitted to a utility meter;

ii. provide a basic command for indicating the presence or absence of an extended command included in the message;

iii. provide identification indicia for a select utility meter;

iv. provide message length indicia for indicating an amount of data included in the message when an extended command is present;

v. provide message type indicia for indicating utility meter and message type wherein the message type indicia indicates a meter type selected from the group consisting of gas, electric and water;

vi. provide an extended command corresponding to the message type indicia when an extended command is present;

vii. provide data associated with the extended command, if necessary, when an extended command is present;

vii. assemble a transmission sequence to include the synchronization string followed by the basic command followed by the identification indicia and, if an extended command is present, followed by the message length indicia followed by the message type indicia followed by the extended command followed by the data, if necessary, into a transmission sequence; and ix. transmit the transmission sequence to a utility meter.

29. An interrogation device for interrogating utility meters using wireless communications comprising:

a. a control system; and b. communication electronics associated with said control system adapted to wirelessly communicate with utility meters using a select protocol, said control system adapted to:

i. assemble a password transmission sequence having a synchronization string and a message including identification indicia for a select utility meter and a password to activate a select data access level within a select utility meter;

ii. wirelessly transmit the password transmission sequence a first time to at least one utility meter including the select utility meter;

iii. wirelessly transmit the password transmission sequence a second time to the select utility meter following the first transmission to confirm the password transmission sequence;

iv. assemble a command transmission sequence having the synchronization string and a message including the identification indicia and a write command configured to cause the select utility meter to store data in a memory location of the select utility meter corresponding to the data access level activated with the password;

v. wirelessly transmit the command transmission sequence to the select utility meter following the second transmission; and vi. wirelessly transmit the command transmission sequence a second time to the select utility meter following the third transmission to confirm the command transmission sequence.

* * * * *